United States Patent

[11] 3,628,796

[72] Inventor Itsuki Ban
829, Higashi-Oizumimachi, Nerima-ku, Tokyo-to, Japan
[21] Appl. No. 12,018
[22] Filed Feb. 17, 1970
[45] Patented Dec. 21, 1971
[32] Priority Feb. 20, 1969
[33] Japan
[31] 44/14295

[54] APPARATUS FOR SHIFTING MAGNETIC HEAD IN MULTITRACK TAPE PLAYER
6 Claims, 4 Drawing Figs.

[52] U.S. Cl. 274/4 A
[51] Int. Cl. G11b 5/00, G11b 15/00
[50] Field of Search 274/4 A, 11 A; 74/112; 179/100.2 CA

[56] References Cited

UNITED STATES PATENTS 3,386,294 6/1968 Waldenburger et al. 274/4 A
3,437,762 4/1969 Lear et al. 274/4 A
3,446,086 5/1969 Peltz et al. 74/112

*Primary Examiner*—Harry N. Haroian
*Attorney*—Jacobs & Jacobs

ABSTRACT: An apparatus for shifting magnetic head in multitrack tape player comprising a displaceable support member coupled to the magnetic head for positioning it with respect to a plurality of discrete and separate record tracks on the tape, cam means coactable with the support member for controlling displacement of the magnetic head to play the record tracks, driving means for rotating the cam means in single steps to position the magnetic head to successive record track positions, and control means for controlling operation of the driving means. The driving means includes a frictional idler wheel which is provided on a swingable swing lever and is caused to be rotatably driven by a capstan for drivingly feeding the tape, and a mechanism rotating the cam means gradually at a predetermined angle when the wheel rotates around its axis. The control means causes the swing lever to automatically swing, upon one rotation of the frictional idler wheel, to a position where the wheel does not receive the rotational force of the capstan. And, in response to the record track switching signal, the control means allows the swing lever to swing to a position where the wheel is rotatably driven by the capstan.

INVENTOR

BY

ATTORNEY

APPARATUS FOR SHIFTING MAGNETIC HEAD IN MULTITRACK TAPE PLAYER

BACKGROUND OF THE INVENTION

This invention relates to a multitrack tape player, and more specifically to an apparatus for shifting a magnetic head to play a plurality of record tracks on the magnetic tape.

A conventional magnetic head-shifting apparatus used in a multitrack or multichannel magnetic tape player is composed of a rotary cam for shifting the magnetic head in synchronizing with record tracks on the tape across the width of the tape, a ratchet wheel mounted coaxially with the cam, and a solenoid having an actuator reciprocally moved to rotatably drive the ratchet wheel step by step through a pawl member. When the solenoid is energized in pulse fashion by the record-track-switching signal to reciprocally move the actuator, the cam is through the ratchet wheel shifted in single steps to position the magnetic head to successive record track positions. The solenoid used in this instance requires relatively more current, for instance, 10 watt to 20 watt. For this reason, if the solenoid is used to operate a rotary electrical switch for controlling a lighting of an indicator lamp for indicating the record track to be played in coacting with the cam, much more current is required. In order to maintain the relative position of the magnetic head to the record track to be played on the tape, it is necessary to maintain the relative position of the cam to the magnetic head. To this end, it is necessary to urge a support member supporting the magnetic head against the cam under a strong bias force to thus increase frictional force between the cam and the support member. Accordingly, in order to maintain the relative position of the magnetic head to the record track to be played on the tape, it is necessary to move the actuator of the solenoid rotatably driving the cam under strong force thus requiring more current. To use the solenoid of more current is not desirable for the magnetic tape player, particularly, relying on battery source. This causes the player to be large dimensioned and a problem in view of a space to mount such the solenoid. In addition, the large dimensioned solenoid produces large impact sound when operated so that the use of such the solenoid for the acoustic instrument is not desirable.

SUMMARY OF THE INVENTION

It is a primary object of the present invention to provide an apparatus for shifting magnetic head in multitrack tape player, which is capable of rotatably driving cam means that shifts the magnetic head, upon utilization of the rotational force of a rotary capstan for drivingly feeding the magnetic tape, to a position in opposition to the record tracks to be played on the tape.

Another object of the invention is to provide an apparatus for shifting magnetic head in multitrack tape player, wherein a frictional idler wheel mounted on a swingable swing lever abuts against the capstan with respect to the swing movement of the swing lever, and is rotatably driven by the capstan whereby the cam is rotatably driven step by step at a predetermined angle whenever the frictional idler wheel rotates round its axis.

A further object of the invention is to provide an apparatus for shifting magnetic head in multitrack tape player wherein the swing lever is normally positioned to a position where the frictional idler wheel does not receive the rotational force of the capstan and in response to energization of the solenoid in pulse fashion by the record track switching signal the swing lever is swung to a position where the frictional idler wheel is rotatably driven by the capstan, the swing lever is automatically swung and returned to its normal position when the frictional idler wheel rotates round its axis, the frictional idler wheel rotates round its axis whenever the solenoid is energized to rotate the cam at a predetermined angle, and the magnetic head is moved to a position for playing the next record track.

According to the apparatus for shifting magnetic head of the present invention, the cam means is rotatably driven by the use of the rotational force of the capstan so that less current is required and strong rotational force is obtained for rotation of the cam means. Further, advantages derived from this is that no impact sound is produced when moving the magnetic head.

Further objects and advantages of the invention will become more readily apparent to one skilled in the art from the following detailed description and drawings, in which;

DESCRIPTION OF THE PREFERRED EMBODIMENTS

Figures 1, 2, 4:
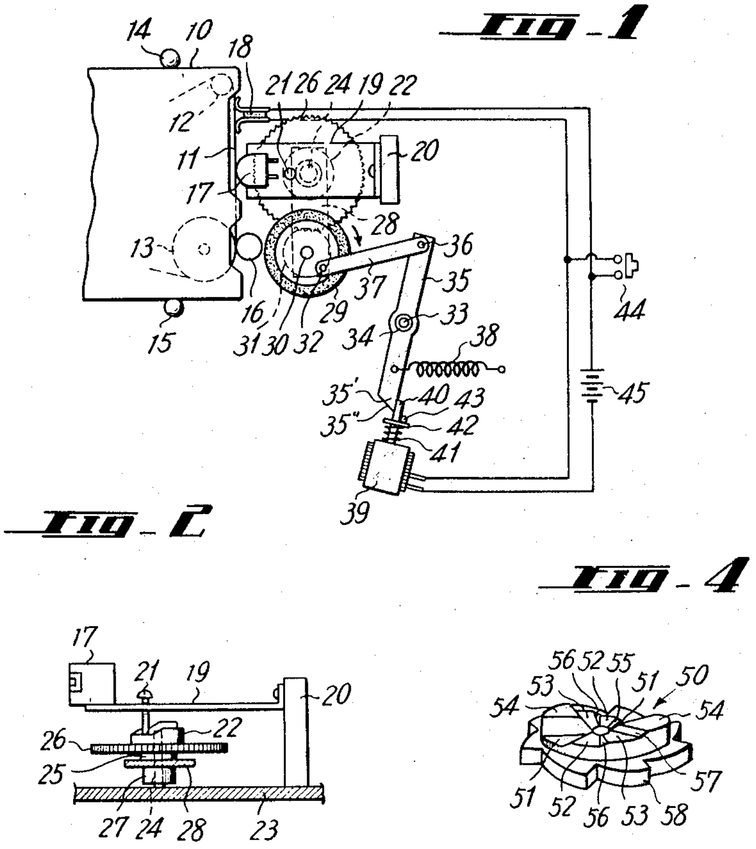
FIG. 1 is a schematic representation explanatory of an embodiment of an apparatus for shifting magnetic head in multitrack tape player.
FIG. 2 is a side view showing vicinity in enlarged scale of the magnetic head and the cam means illustrated in FIG. 1.
FIG. 4 is a perspective view showing the cam in enlarged scale in FIG. 3.

FIG. 1 shows a multitrack endless magnetic tape cartridge player, with partially broken away, in which is provided an embodiment of an apparatus for shifting magnetic head according to the present invention, and wherein numeral 10 is an endless magnetic tape cartridge which is put in order by guides 14 and 15 and then positioned in a predetermined playing position. The cartridge 10 includes a generally rectangular container with a centrally disposed reel (not shown) on which an endless magnetic tape 11 is wound and unwound in a conventional manner. The tape 11 passes over a guide 12 and a pinch roller 13. The guide and the pinch roller are disposed adjacent the leading edge of the cartridge whereat the cartridge sidewall is cut away or disposed with and the tape 11 is extended from the center of the hub of the reel (not shown) about the guide 12 and thence about the pinch roller 13 back to the outer periphery of a roll formed by the tape wound about the hub. There are provided on the deck of the tape cartridge player a capstan 16 for driving the tape 11, a magnetic head 17 adapted to transduce the tape 11, and an endmark selection or sensing means 18 having a pair of feeler contacts which are shorted by a conductive foil (not shown) as endmark on the tape 11. These members mentioned above are mounted on the deck so as to oppose to the leading edge of the cartridge 10 positioned in the playing position. The capstan 16 is connected to an electrical motor (not shown) and rotatably driven by a preset constant speed. The capstan 16 firmly presses the tape 11 against the pinch roller 13 in its drive relation. The tape 11 which is driven by operation of the pinch roller 13 and the capstan 16 is transported passing over the endmark detector 18 and the magnetic head 17.

By means of an apparatus for shifting magnetic head of the present invention as will be described later, the magnetic head 17 may be positioned at a plurality of different predetermined fixed points across the width of the tape 11, thereby reproducing a plurality of discrete and separate record tracks upon the tape at these points. The magnetic head 17 is firmly secured to an L-shaped displaceable support plate or leaf spring 19 of which one end portion is fixed to a stable member 20 on a baseplate 23 (FIG. 2). A threaded pin 21 is held in a threaded aperture (not shown) of the support member 19. The rounded bottom end of the threaded pin 21 is arranged to ride on a stepped face cam 22 (FIG. 2). The leaf spring 19 is intended to allow its free end to downwardly move since elasticity inheres therein to maintain the pin 21 and the face cam 22 in operative relation. The face cam 22 is arranged to shift the magnetic head into a plurality of discrete record tracks on the tape 11. The face cam 22 comprises a plurality of flat steps which are different in each height and arranged along the periphery of the cam to oppose to each record track on the tape 11. Ramps are provided between the flat steps of the cam 22. The lowest flat step of the cam 22 positions the magnetic head 17 at the lowest record track on the tape 11. The threaded pin 21 is adapted to assume this. When the face cam 22 is rotatably driven by one step by a driving means as will be described later, the threaded pin 21 rides up the adjacent ramp to the next flat step of the cam. The details of the driving means will be understood from the following description by reference to FIGS. 1 and 2. Similar numerals are used in FIGS. 1 and 2 to illustrate like parts. The face cam 22 is rotatably supported by a sleeve over a shaft 24 vertically extending from the baseplate 23. A gear 26 included in the driving means with the face cam 22 is mounted on the sleeve 25. A swing lever 28 is swingably supported by a sleeve 27 distinct from the sleeve 25 over the shaft 24. A rubber covered frictional wheel 29 is supported by an axis pivotally mounted adjacent the free end of the swing lever 28. The frictional wheel 29 as will be described later is caused to abut against the capstan 16 by rotation of the swing lever 28 from the position as shown to the clockwise direction and is rotatably driven by the capstan 16. Supported by the axis 30 is a gear 31 meshing with the gear 26 and the frictional idler wheel 29. The gears 31 and 26 constitute a reducing gearing and rotation of the frictional idler wheel 29 is reduced to be imparted to the face cam 22. In this instance, the ratio of the gear 31 and the gear 26 is 1:4, and the face cam 22 is adapted to rotate at an angle of 90° when the frictional wheel 29 rotates round its axis. A lever 35 is swingably at the midportion thereof supported by a sleeve 34 over a fixed pin 33. And, a pin 32 is mounted on the frictional wheel 29 at a portion offset from the center thereof and a link member 37 is coupled to the pin 32 and a pin 36 mounted on the lever 35 at one end thereof. The link member 37 is adapted to freely rotate relative to the pin 32 and the pin 36. The link member 37 cooperates with the lever 35 to constitute control means for controlling swingable movement of the swing lever 28. The lever 35 is normally given a counterclockwise rotational force by a tension spring 38. Rotational force of the lever 35 derived from the spring 38 is normally arrested by one end portion 35′ of the lever 35 in engagement with an actuator 40 of a solenoid 39. The actuator 40 is urged by a spring 41 in the direction in which it projects from the solenoid 39, however, inward movement of the actuator is limited by a stopper pin 43 engageable with a flange 42 on the actuator. The solenoid 39 is electrically connected through a parallel connection of the endmark detector 18 and a pushbutton switch 44 to an electrical source. In response to that a pair of mutual insulated feeler contacts of the endmark detector 18 are shorted by a conductive patch (not shown) provided on the tape 11 or the pushbutton switch 44 is manually operated and then closed, the solenoid 39 is supplied with the current from the source 45.

The operation of the apparatus for shifting magnetic head of the invention shown in FIGS. 1 and 2 will be understood from the following description.

During performance of the cartridge 11, the two feeler contacts of the endmark detector 18 is shorted by the conductive patch (not shown) on the tape 11 or the pushbutton switch 44 is manually operated and then closed to thereby energize the solenoid 39 by means of the source 45 so that the actuator 40 is attracted against the elasticity of the spring 41 to a position where it is released from the lever 35. When the lever 35 is disengaged from the actuator 40 of the solenoid 39, it is counterclockwise rotated by the elasticity of the spring 38. With rotation of the lever 35, the swing lever 28 is swung to a position where the frictional idler wheel 29 abuts against the capstan 16. Abutment force of the frictional wheel 29 against the capstan 16 is given by the bias of the tension spring 38 via the lever 35, the link member 37, the frictional wheel 29, and the swing lever 28. Rotation of the frictional wheel 29 which is rotatably driven in the direction of the arrow as shown by abutment against the capstan 16 is transmitted through the gears 31, 26 to the face cam 22. The link member 37 is at its one end connected to the frictional wheel 29 at a portion offset from the center thereof and is therefore reciprocally moved as the frictional wheel 29 is rotated. While the frictional wheel 29 initiates its rotation in the direction of the arrow as shown until the pin 32 is closest to the capstan 16, the link member 37 is moved in the leftward direction. Leftward movement of the link member 37 allows the lever 35 to counterclockwise swing about the axis 33. Further, for the period that the frictional wheel 29 is rotated in the direction of the arrow as shown until the pin 32 is gradually away from the capstan 16 and further thereto, the link member 37 is caused to move in the rightward direction. With rightward movement of the link member 37, the lever 35 is counterclockwise rotated about the axis 33 against the bias of the tension spring 38. In the course in which the lever 35 is counterclockwise rotated, the slanted portion 35″ of the one end portion 35′ of the lever 35 comes in slidable contact with the one end of the actuator 40 of the solenoid 39 which has been energized, and is moved liftwardly of the actuator 40 while urging the actuator 40 against the bias of the spring. When the lever 35 is clockwise and extremely swung, the one end portion 35′ of the lever 35 is positioned slightly away from the actuator 40. Further rotation of the frictional wheel 29 initiates counterclockwise swingable movement of the lever 35 to engage the one end portion 35′ with the actuator 40. After the one end portion 35′ is in engagement with the actuator 40, swingable movement of the lever 35 is arrested and in relation thereto movement of the link member 37 is also arrested. As a result, with rotation of the frictional wheel 29, the swing lever 28 is gradually and counterclockwise swung to weaken abutment force between the frictional wheel 29 and the capstan 16. When the frictional wheel 29 rotates round its axis from the initial state, abutment force between the frictional wheel 29 and the capstan 16 decays to stop rotation of the frictional wheel 29 and swingable movement of the swing lever 28. This condition is shown in FIG. 1. In FIG. 1 there is shown a space as provided between the capstan 16 and the frictional wheel 29, however, no space is actually provided and the capstan 16 is in contact with the frictional wheel 29 so as not to transmit rotational force of the capstan 16 to the frictional wheel 29. For this reason, the range in which the swing lever 28 is swung is considerably limited. It will be understood from the foregoing, the frictional wheel 29 rotates round its axis whenever the solenoid 39 is energized in pulse fashion. Since the ratio of the gear 31 and the gear 26 is 1:4, the face cam 22 is rotated to form an angle of 90° when the frictional wheel 29 rotates round its axis. Therefore, where the flat stops of the face cam 22 are arranged spaced away at angle of 90° to the number of four, the magnetic head 17 is shifted by one step at each time when the solenoid 39 is activated. More specifically, the magnetic head 17 may be positioned at four different predetermined fixed point across the width of the tape 11.

Where the record tracks on the tape 11 are provided to the member of two, two flat steps are provided spaced away at angle of 180° on the face cam 22 and the ratio of the gear 31 and the gear 26 is 1:2 so that the face cam is rotated at angle of 180° with the frictional wheel 29 rotating round its axis whenever the solenoid 39 is energized in pulse fashion. From this, it will be apparent that the magnetic head 17 is alternatively shifted to a position for playing two record tracks on the tape.

Figure 3:
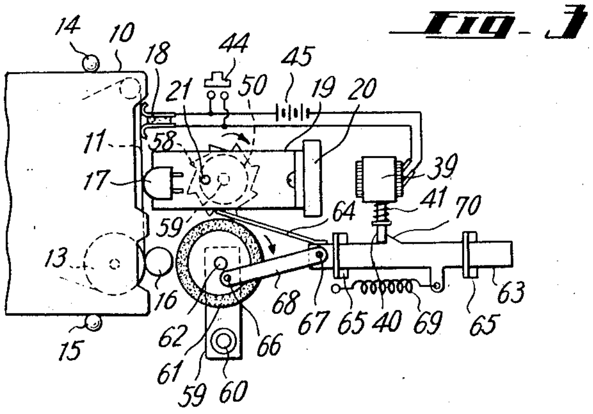
FIG. 3 is a schematic representation explanatory of another embodiment of the apparatus for shifting magnetic head in multitrack tape player.

FIG. 3 shows another embodiment of the apparatus for shifting magnetic head of the present invention, wherein similar numerals are used to illustrate like parts in FIG. 1. Numeral 50 denotes a face cam which corresponds to the cam 22 (FIG. 1) and is rotatably supported by a shaft 59 mounted on a baseplate (not shown).

The face cam 50 comprises two separate successive sets of four shift steps along its peripheral face, as seen in FIG. 4. The lowest flat steps 51, 51 position the magnetic head 17 at the lowest record track on the tape 11. The threaded pin 21 assures this. When a ratchet wheel 58 of the face cam 50 is gripped by a pawl member 64 to advance one step, in the direction of the arrow, the threaded pin 21 rides up the adjacent ramps 55, 55 to flat steps 52, 52. The third flat steps 53, 53 are reached through ramps 56, 56; the highest flat steps 54, 54 through ramps 57, 57. The driving means of the face cam 50 includes a swing lever 59 swingably mounted on a shaft 60 on the baseplate (not shown). A rubber covered frictional idler wheel 61 is rotatably supported on an axis 62 on the swing lever 59. The frictional wheel 61 as will be described later is caused to abut against the capstan 16 by rotation of the swing lever 59 from the position as shown to the counterclockwise direction and is rotatably driven by the capstan. A reciprocating lever 63 which is provided at one end thereof with the pawl member 64 engaging the ratchet tooth 58 is slidably supported by guides 65, 65 on the deck in the tape player housing (not shown). A link member 68 is coupled to a pin 66 mounted on a portion offset from the center of the frictional wheel 61 and a pin 67 mounted on the reciprocating lever 63. The reciprocating lever 63 is urged by a tension spring 69 in the leftward direction, but movement of the lever is normally held by engagement of a hook portion 70 of the lever with the actuator 40 of the solenoid 39. The solenoid 39 is energized in pulse fashion by a control circuit including the endmark detector 18, the track-selecting pushbutton switch 44, and the electrical source 45 whereby the actuator 40 is moved to a position, against the bias of the spring 41, wherein it is released from the hook portion 70 of the lever 63. In response to disengagement of the actuator 40 with the hook portion 70, the reciprocating lever 63 is moved by the bias of the tension spring 69 from the position as shown to the leftward direction and the swing lever 59 is counterclockwise swung by the link member 68 to urge the frictional wheel 61 against the capstan 16. As a result, the frictional wheel 61 is rotatably driven by the capstan 16. Rotation of the frictional wheel 61 initially moves the reciprocating lever 63 in the leftward direction through the link member 68. The frictional wheel 61 is rotated until the pin 66 is closest to the capstan 16 to terminate leftward movement of the reciprocating lever 63. Further rotation of the frictional wheel 61 initiates rightward movement of the reciprocating lever 63. While the frictional wheel 61 is rotated until the pin 66 is further to the capstan 16, the reciprocating lever 63 keeps rightward movement of the reciprocating lever 63. In the course in which the reciprocating lever 63 is rightwardly moved, the hook portion 70 is moved passing over the actuator 40 rightwardly thereof. Further rotation of the frictional wheel 61 moves the reciprocating lever 63 leftwardly again, and the hook portion 70 engages the actuator 40 just prior to that the frictional wheel 61 rotates round its axis from the initial state thereby stopping movement of the reciprocating lever 63. Consequently, further rotation of the frictional wheel 61 clockwise swings the swing lever gradually to thus weaken abutment between the frictional wheel 61 and the capstan 16. When the frictional wheel 61 rotates round its axis from the first state to lose abutment force between the frictional wheel 61 and the capstan 16 thereby stopping rotation of the frictional wheel 61 and swingable movement of the swing lever 59. The condition at this movement is shown in FIG. 3. In FIG. 3, there is shown a space as provided between the capstan 16 and the frictional wheel 61, however, no space as shown is actually provided and the capstan 16 makes contact with the frictional wheel 61 so as not to transmit rotation of the capstan 16 to the frictional wheel 61. Accordingly, the range in which the swing lever 59 is swung is extremely limited. It is apparent from the foregoing, the frictional wheel 61 rotates round its axis and the reciprocating lever 63 makes one reciprocal movement whenever the solenoid 39 is energized. By one reciprocal movement of the reciprocating lever 63, the pawl member 64 which engages the ratchet tooth 58 rotates the face cam 50 to the next step portion. Thus, the solenoid 39 is supplied with current in pulse fashion by the control circuit at which time the face cam 50 is rotated at one step to allow the magnetic head 17 to move to a position where the head will play the record tracks on the tape 11 successively.

It will be readily understood that the small dimensioned solenoid of less current is efficient for the purpose since the solenoid 39 shown in FIGS. 1 and 3 is not used as drive source for rotatably driving the face cam 22 or the face cam 50.

While the invention has been shown and described in preferred embodiments, many changes and modifications may be made without departing from the spirit of the invention defined in the appended claims.

What is claimed is:

1. An apparatus for shifting magnetic head in multitrack tape player including a rotary capstan for driving a magnetic tape and at least one magnetic head adapted to transduce the tape, said apparatus comprising:

a displaceable support member coupled to the magnetic head for positioning it with respect to a plurality of discrete and separate record tracks on the magnetic tape;

cam means coactable with the support member for controlling displacement of the magnetic head to play the record tracks, said cam means having a plurality of successive cam regions spaced apart in correspondence with the record tracks, said cam regions being constructed to displace the support member to corresponding positions when in individual coaction therewith and thereby position the magnetic head for play with associated record tracks; driving means for rotating the cam means in single steps to position the magnetic head to successive record track positions, said driving means including a rotary member provided coaxially with the cam means, a swing lever swingably provided, a frictional idler wheel rotatably mounted on said swing lever and abutting against said capstan to allow said idler wheel to be rotated with rotation of said swing lever, and a transmission member for transmitting rotation of said frictional idler wheel to said rotary member, control means for controlling swingable movement of the swing lever, said control means including a lever member displaceably provided, a link member connected to a portion offset from the center of the frictional idler wheel and one end portion of said lever member, a tension spring urging said lever member in one direction for providing swingable motion to the swing lever via said lever member, said link member, and the frictional idler wheel in a manner that the frictional idler wheel abuts against the capstan, a solenoid means retaining said lever member against the elasticity of said tension spring for maintaining the swing lever at a position where the frictional idler wheel is not rotatably driven by the capstan, and a control circuit generating the record-track-switching signal for energizing said solenoid means in pulse fashion, said solenoid means being energized by said control circuit to move said actuator to a position where said actuator is released from said lever member and in response thereto the swing lever being swung by the bias of said tension spring to a position where the frictional wheel abuts against the capstan and is then rotated, said lever member being reciprocated by said link member in response to rotation of the frictional idler wheel, said link member being retained by said solenoid means when the wheel rotates round its axis while said swing lever being returned to a position where the wheel does not receive rotational force of the capstan, and said frictional idler wheel rotating round its axis whenever said solenoid means is energized by said control circuit.

2. An apparatus for shifting magnetic head in accordance with claim 1, wherein said rotary member of said driving means is a gear of large diameter, said transmission member is provided coaxially with said frictional idler wheel and is a gear of small diameter engaging said gear, and said cam means is rotated at an angle corresponding to an angle between the adjacent cam regions when said frictional idler wheel rotates round its axis.

3. An apparatus for shifting magnetic head in accordance with claim 1, wherein said rotary member of said driving means is a ratchet wheel having a plurality of teeth in number corresponding to said cam regions of said cam means, said transmission member is a pawl member which is provided on said lever member of said control means and engageable with teeth of said ratchet wheel, said ratchet wheel being rotatably driven step by step by the pawl member by reciprocal movement of said lever member with rotation of said frictional idler wheel.

4. An apparatus for shifting magnetic head in accordance with claim 3, wherein said lever member of said control means is linearly and slidably supported by at least one guide member.

5. An apparatus for shifting magnetic head in accordance with claim 1, said control circuit of said control means includes a pair of feeler contacts which are mutually insulated and shorted by a conductive patch provided on said magnetic tape, and further includes a sensing means electrically connected in series with said solenoid means, and an electrical source applying the current to the solenoid means by means of said sensing means.

6. An apparatus for shifting magnetic head in accordance with claim 5, wherein a push button electrical switch which is manually operated and then closed is connected in parallel with said sensing means of said control circuit.

* * * * *